United States Patent [19]
Yamaguchi

[11] Patent Number: 5,838,591
[45] Date of Patent: Nov. 17, 1998

[54] TEMPERATURE CONTROL APPARATUS FOR MOTOR AND INFORMATION STORING MEDIUM USED THEREFOR

[75] Inventor: Hiroshi Yamaguchi, Nagoya, Japan

[73] Assignee: Brother Kogyo Kabushiki Kaisha, Nagoya, Japan

[21] Appl. No.: 873,188

[22] Filed: Jun. 11, 1997

[30] Foreign Application Priority Data

Jun. 20, 1996 [JP] Japan .................................. 8-160048

[51] Int. Cl.$^6$ .................................................. H02H 7/00
[52] U.S. Cl. ............... 364/557; 364/571.03; 364/571.02; 364/571.05; 361/23; 361/24; 361/25; 361/28
[58] Field of Search .............................. 364/557, 571.03, 364/571.02, 571.05; 361/23, 24, 25, 28; 318/471, 472

[56] References Cited

U.S. PATENT DOCUMENTS

| | | | |
|---|---|---|---|
| 4,616,324 | 10/1986 | Simmel | 364/483 |
| 5,123,081 | 6/1992 | Bachman et al. | 361/24 |
| 5,168,415 | 12/1992 | Osuga | 361/28 |
| 5,283,708 | 2/1994 | Waltz | 361/24 |
| 5,418,677 | 5/1995 | Engel | 361/25 |
| 5,644,510 | 7/1997 | Weir | 364/557 |

*Primary Examiner*—James P. Trammell
*Assistant Examiner*—Hien Vo
*Attorney, Agent, or Firm*—Oliff & Berridge, PLC

[57] ABSTRACT

An apparatus is provided for controlling temperature of a motor by estimation. The temperature apparatus includes an initial setting circuit for setting an initial value of a temperature representative variable $\theta$, a temperature rise estimating circuit for calculating $\theta + A$ (where A is an incremental parameter reflecting a temperature rise under driving of the motor) for renewal of $\theta$ when the motor is driven, a temperature drop estimating circuit for calculating $\theta - \theta/S$ (where S is decremental parameter reflecting a temperature drop by heat dissipation of the motor) for renewal of $\theta$ periodically at a predetermined time interval while the temperature control apparatus is operating, and a power supply prevention circuit for preventing power supply to the motor when $\theta$ becomes no less than $\theta$max (which is an upper limit parameter reflecting an upper tolerable limit temperature of the motor) and until $\theta$ becomes lower than $\theta$max.

21 Claims, 6 Drawing Sheets

TEMPERATURE CONTROL APPARATUS FOR MOTOR AND INFORMATION STORING MEDIUM USED THEREFOR

BACKGROUND OF THE INVENTION

1. Field of the Invention

The present invention relates to a temperature control apparatus for a motor of a facsimile machine for example. More particularly, the present invention relates to an apparatus for controlling the temperature of a motor by software estimation. The present invention also relates to an information storing medium which is used for such a temperature control apparatus.

2. Description of the Related Art

In a facsimile machine, for example, a paper feed motor for feeding a paper in the reading unit and/or the recording unit is a heat generating load. Therefore, the paper feed motor need be controlled for protection against damage due to an overheat.

One way for protecting a paper feed motor of a facsimile machine against a thermal damage is to provide, as a hardware addition, a temperature sensor which detects the motor temperature for controlling power supply to the motor. However, the provision of the temperature sensor results in an added cost while also requiring a separate mounting space. Further, it is also necessary to provide an I/O port for transmission of detection signals from the temperature sensor to the central processing unit of the facsimile machine.

Another way for protecting a paper feed motor of a facsimile machine against an overheat is to make a software addition by which a successive copying prohibition period is inserted after copying a predetermined number of papers. During this successive copying prohibition period, copying can take place only upon lapse of a predetermined pause between each two successive papers, but the copying never occurs in quick succession. Such a countermeasure is adopted in view of the fact that the paper feed motor is mostly likely to be overheated at the time of successive copying.

According to the software addition described above, if the successive copying prohibition period fixed in advance is too short, the paper feed motor may unexpectedly suffer an overheat. Thus, to prepare for the worst condition, it is necessary to set a sufficient time as the successive copying prohibition period. As a result, the user must wait for a long time before being able to restart successive copying. Further, though an overheat of the paper feed motor may occur due to causes other than successive copying, the prior art software addition does not take account of such a situation.

SUMMARY OF THE INVENTION

It is, therefore, an object of the present invention is to provide a temperature control apparatus for a motor (more generally a heat generating load) which is capable of controlling the motor temperature by software estimation without actually detecting the motor temperature.

Another object of the present invention is to provide an information storing medium which can be advantageously used for such a temperature control apparatus.

According to one aspect of the present invention, there is provided an apparatus for controlling temperature of a motor by estimation on the basis of a temperature representative variable $\theta$ as well as different parameters which include an incremental parameter A reflecting a temperature rise under driving of the motor, a decremental parameter S reflecting a temperature drop by heat dissipation of the motor, and an upper limit parameter $\theta max$ reflecting an upper tolerable limit temperature of the motor, the apparatus comprising: initial setting means for setting an initial value of $\theta$; temperature rise estimating means for calculating $\theta + A$ for renewal of $\theta$ when the motor is driven; temperature drop estimating means for calculating $\theta - \theta/S$ for renewal of $\theta$ periodically at a predetermined time interval while the temperature control apparatus is operating; and power supply prevention means for preventing power supply to the motor when $\theta$ becomes no less than $\theta max$ and until $\theta$ becomes lower than $\theta max$.

With the temperature control apparatus described above, the temperature rise estimating means provides an estimated temperature increase (namely, an increase of $\theta$) resulting from driving of the motor, whereas the temperature drop estimating means provides an estimated temperature decrease (namely, a decrease of $\theta$) due to heat dissipation from the motor with lapse of time. Therefore, if the incremental parameter A and the decremental parameter S are properly set, the temperature of the motor can be accurately estimated by monitoring the value of the variable $\theta$ without actually detecting the motor temperature. As a result, an overheat of the motor can be reliably prevented by stopping power supply to the motor when the value of $\theta$ exceeds $\theta max$, and the motor drive may be resumed immediately upon a fall of $\theta$ below $\theta max$.

Further, all of the initial setting means, the temperature rise estimating means, the temperature drop estimating means and the power supply prevention means may be provided by a central processing unit which operates on a predetermined processor program. Thus, the temperature control apparatus requires no hardware addition, thereby leading to a cost reduction.

According to a preferred embodiment, the power supply prevention means first subtracts a predetermined compensation parameter R from $\theta$ for compensation thereof when $\theta$ becomes no less than $\theta max$, and the power supply prevention means prevents power supply to the motor only when the thus compensated $\theta$ is still higher than $\theta max$. Further, the temperature drop estimating means calculates $\theta - \theta/S$ for renewal of $\theta$ as an interruption process.

Typically, the motor may be driven under different operation modes, and the temperature control apparatus may further comprise parameter setting means for setting the parameters A, S and $\theta max$ selectively depending on the different operation modes. Further, the motor may be a paper feed motor of a copying machine, and the parameter setting means may be designed to set a lower value for $\theta max$ in a copy mode than in any other operation mode. Such a design is advantageous for enable more accurate temperature control of the motor in consideration of the selected operation mode.

The term "copying machine" as herein used should be interpreted in its broadest sense. Thus, this term covers any machine, such as a photoelectrographic copying machine or a facsimile machine, which has a copying function.

Advantageously, the temperature control apparatus may further comprise wait-time reduction means for determining whether $\theta$ is higher than $\theta max$ upon a shift to the copy mode from another operation mode and for replacing $\theta$ with $\theta max$ when $\theta$ is determined to be higher than $\theta max$.

Alternatively, the parameter setting means may be designed to set a lower limit parameter $\theta min$ for reflecting an ambient temperature rise in a copy mode, and the temperature rise estimating means may have additional functions of determining in the copy mode whether θ is lower than θmin and replacing θ with θmin when θ is determined to be lower than θmin.

Further alternatively, the parameter setting means may be designed to set a lower limit parameter θmin for reflecting an ambient temperature rise in a copy mode, and the temperature drop estimating means may have additional functions of determining, periodically at the predetermined time interval in the copy mode, whether θ is lower than θmin and replacing θ with θmin when θ is determined to be lower than θmin.

According to another aspect of the present invention, there is provided an apparatus for controlling temperature of a heat generating load by estimation on the basis of a temperature representative variable θ as well as different parameters which include an incremental parameter A reflecting a temperature rise under driving of the load, a decremental parameter S reflecting a temperature drop by heat dissipation of the load, and an upper limit parameter θmax reflecting an upper tolerable limit temperature of the load, the apparatus comprising: initial setting means for setting an initial value of θ; parameter setting means for setting the parameters A, S and θmax selectively depending on different operation modes of the load; temperature rise estimating means for calculating θ+A for renewal of θ when the load is driven; temperature drop estimating means for calculating θ−θ/S for renewal of θ periodically at a predetermined time interval while the temperature control apparatus is operating; and power supply prevention means for preventing power supply to the load when θ becomes no less than θmax and until θ becomes lower than θmax.

According a further aspect of the present invention, there is provided a processor program embodied on an information storing medium for controlling temperature of a motor by estimation on the basis of a temperature representative variable θ as well as different parameters which include an incremental parameter A reflecting a temperature rise under driving of the motor, a decremental parameter S reflecting a temperature drop by heat dissipation of the motor, and an upper limit parameter θmax reflecting an upper tolerable limit temperature of the motor, the processor program comprising: an initial setting program for setting an initial value of θ; a temperature rise estimating program for calculating θ+A for renewal of θ when the motor is driven; a temperature drop estimating program for calculating θ−θ/S for renewal of θ periodically at a predetermined time interval; and a power supply prevention program for preventing power supply to the motor when θ becomes no less than θmax and until θ becomes lower than θmax.

Preferably, the processor program may further comprise a parameter setting program for setting the parameters A, S and θmax selectively depending on different operation modes of the motor.

Further, the processor program may further comprise a wait-time reduction program for determining whether θ is higher than θmax upon a shift to said one operation mode from another operation mode and for replacing θ by θmax when θ is determined to be higher than θmax.

Other objects, features and advantages of the present invention will be apparent from the detailed description of the embodiment given below with reference to the accompanying drawings.

DETAILED DESCRIPTION OF THE PREFERRED EMBODIMENTS

The preferred embodiment of the present invention will be described below with reference to the accompanying drawings.

Figure 1:
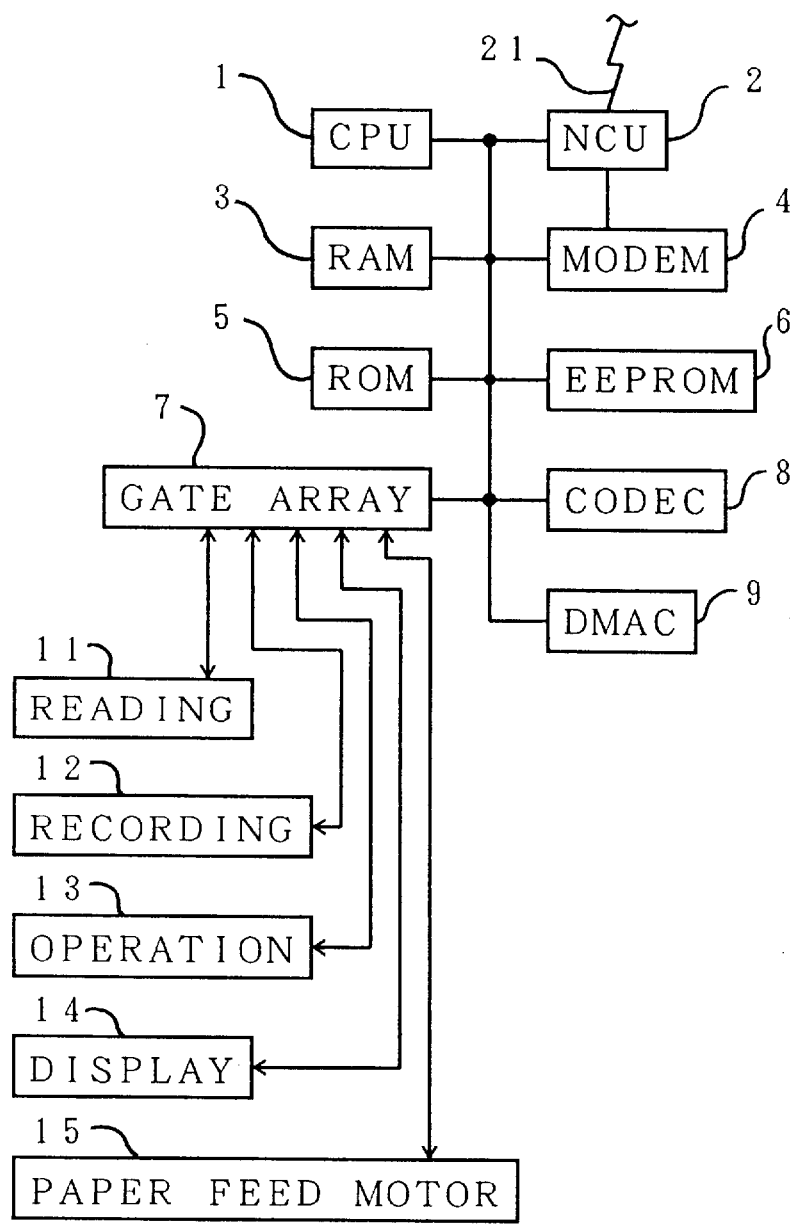
FIG. 1 is a circuit block diagram showing a facsimile machine which incorporates a motor temperature control apparatus embodying the present invention.

Reference is first made to FIG. 1 which is a circuit block diagram showing a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading unit 11, a recording unit 12, an operation unit 13, a display unit 14, and a paper feed motor 15.

The CPU 1, the NCU 2, the RAM 3, the modem 4, the ROM 5, the EEPROM 6, the gate array 7, the codec 8 and the DMAC 9 are connected to each other via bus lines (digital lines) which include data bus lines, address bus lines and control signal bus lines. The gate array 7 is connected to the reading unit 11, the recording unit 12, the operation unit 13, the display unit 14, and the paper feed motor 15, respectively.

The CPU 1 provides an overall control of the facsimile machine as a whole.

The NCU 2 is connected to a telephone line 21 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine. Several of the programs stored in the ROM 5 will be hereinafter described more in detail.

The EEPROM 6 stores registered data (e.g. shortcut dials) and/or flags.

The gate array 7 functions as an I/O interface (input/output interface) for the CPU 1 for data transmission to and/or from the reading unit 11, the recording unit 12, the operation unit 13 and the display unit 14.

The codec 8 performs coding of the transmitting image data and decoding of the received image data.

The DMAC 9 provides memory access control with respect to the RAM 3 for example.

The reading unit 11 reads out the image data from an image carrying paper (not shown) for output through the gate array 7, whereas the recording unit 12 performs printing of images on a recording paper (not shown) on the basis of the image data received through the gate array 7.

The operation unit 13 has key switches to be operated by the user for output of operation signals, whereas the display unit 14 includes an LCD or the like for providing various indications under the control of the CPU 1.

The paper feed motor 15 is controlled by the CPU 1 for feeding the image carrying paper in the reading unit 11 via a transmission mechanism (not shown) which includes a train of gears. The CPU 1 also provides temperature control of the paper feed motor 15, as hereinafter described.

According to the illustrated embodiment, the paper feed motor 15 is used for feeding an image carrying paper in the reading unit 11. However, the paper feed motor 15 may be used for feeding an image recording paper in the recording unit 12. Alternatively, the paper feed motor 15 may be dually used for feeding an image carrying paper in the reading unit 11 and for feeding an image recording paper in the recording unit 12.

Figure 2:
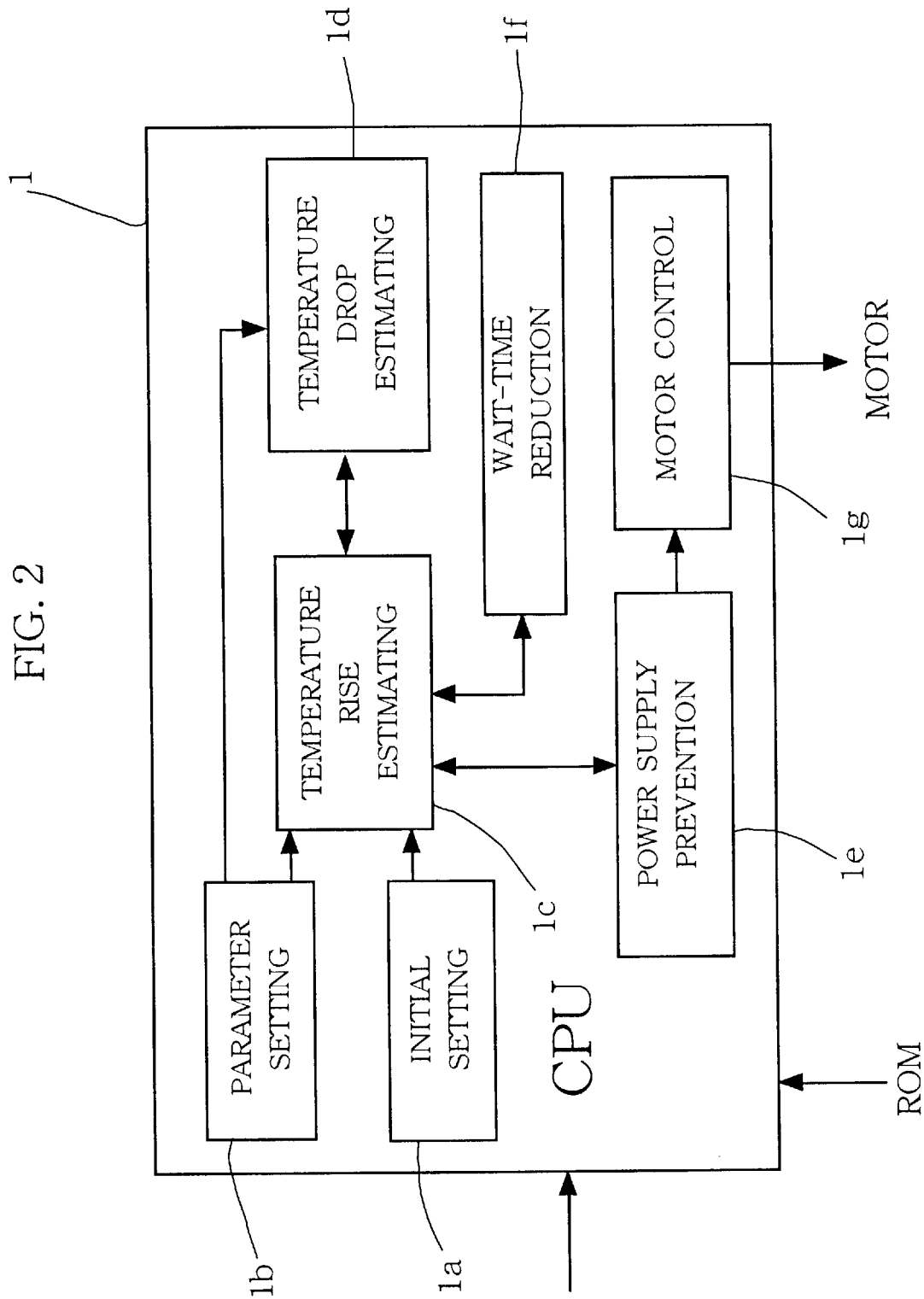
FIG. 2 is a block diagram showing the arrangement of the CPU incorporated in the same facsimile machine.

As shown in FIG. 2, the CPU 1 incorporates an initial setting means 1a, a parameter setting means 1b, a temperature rise estimating means 1c, a temperature drop estimating means 1d, a power supply prevention means 1e, a wait-time reduction means 1f, and a motor control means 1g.

The initial setting means 1a sets a predetermined initial value for a variable $\theta$ which is representative of the temperature (actually, the estimated temperature) of the paper feed motor 15. Such initial setting may be effected for example at the time of turning on the facsimile machine or at the time of first actuating the motor 15. The initial value for the variable $\theta$ may be an integer of no less than zero (0) or equal to the room temperature. Alternatively, when the motor is turned on immediately after turning off at a relatively high temperature, the initial value for the variable $\theta$ may be correspondingly high.

The parameter setting means 1b sets various parameters necessary for estimating the temperature of the paper feed motor 15 and for controlling the operation of the same. These parameters have been experimentally and empirically determined depending on the operating conditions (modes) and design of the facsimile machine. Specifically, the parameters include an incremental parameter A which is used for estimating a temperature rise of the motor 15, an upper limit parameter $\theta$max which represents the upper limit temperature (namely, the tolerable limit temperature) of the motor, a decremental parameter S which is used for estimating a temperature drop of the motor on a periodic basis, and a compensation parameter R for making a adjustment of temperature estimation (by subtracting R from the variable $\theta$) when the value of the variable $\theta$ becomes higher than $\theta$max.

The temperature rise estimating means 1c calculates $\theta+A$ while the paper feed motor 15 is driven, and uses the resulting sum as a new value for $\theta$. The parameter A is set to reflect the drive energy of the paper feed motor 15, and may be a constant value if the paper size is constant. If the paper size is variable, the parameter A may also be variable correspondingly.

The temperature drop estimating means 1d calculates $\theta-\theta/S$ while the facsimile machine is operating., and sets the resulting value as a new value for $\theta$. The parameter S is set to reflect a temperature drop per unit time due to heat dissipation, into the ambient, of the paper feed motor 15. The operation of the temperature drop estimating means 1d occurs periodically at a predetermined time interval of e.g. 1/60 seconds as an interruption process relative to the operation of the temperature rise estimating means 1c.

With regard to the temperature drop estimating means 1d, since the temperature drop, per unit time, of the paper feed motor 15 increases with increasing temperature difference between the motor temperature and the ambient temperature, the calculation $\theta-\theta/S$ also provides a greater value (namely, a larger temperature drop) as the variable $\theta$ (namely, the estimated temperature of the motor) increases, thus closely simulating an actual temperature drop of the motor. A different value may be set for the parameter S depending on whether the cooling fan motor (not shown) is operating or not.

When the variable $\theta$ (namely, the estimated temperature of the paper feed motor 15) exceeds $\theta$max, the power supply prevention means 1e causes the motor control means 1g to prevent power supply to the motor 15 until $\theta$ drops below $\theta$max. At this time, the power supply prevention means 1e also calculates a temperature drop by subtracting the compensation parameter R from the variable $\theta$.

When the facsimile machine is shifted to the copy mode from any other operation mode, the wait-time reduction means 1f serves to reduce the time needed for the user to wait before starting the copy mode, as hereinafter described more in detail.

The various means of the CPU 1 described above performed their respective functions by reading out necessary programs from the ROM 5. Specifically, the ROM 5 stores an initial setting program for input to the initial setting means 1a, a parameter setting program for input to the parameter setting means 1b, a temperature rise estimating program for input to the temperature rise estimating means 1c, a temperature drop estimating program for input to the temperature drop estimating means 1d, a power supply prevention program for input to the power supply prevention means 1e, a wait-time reduction program for input to the wait-time reduction means 1f, and a motor control program for input to the motor control means 1g.

Figure 3:
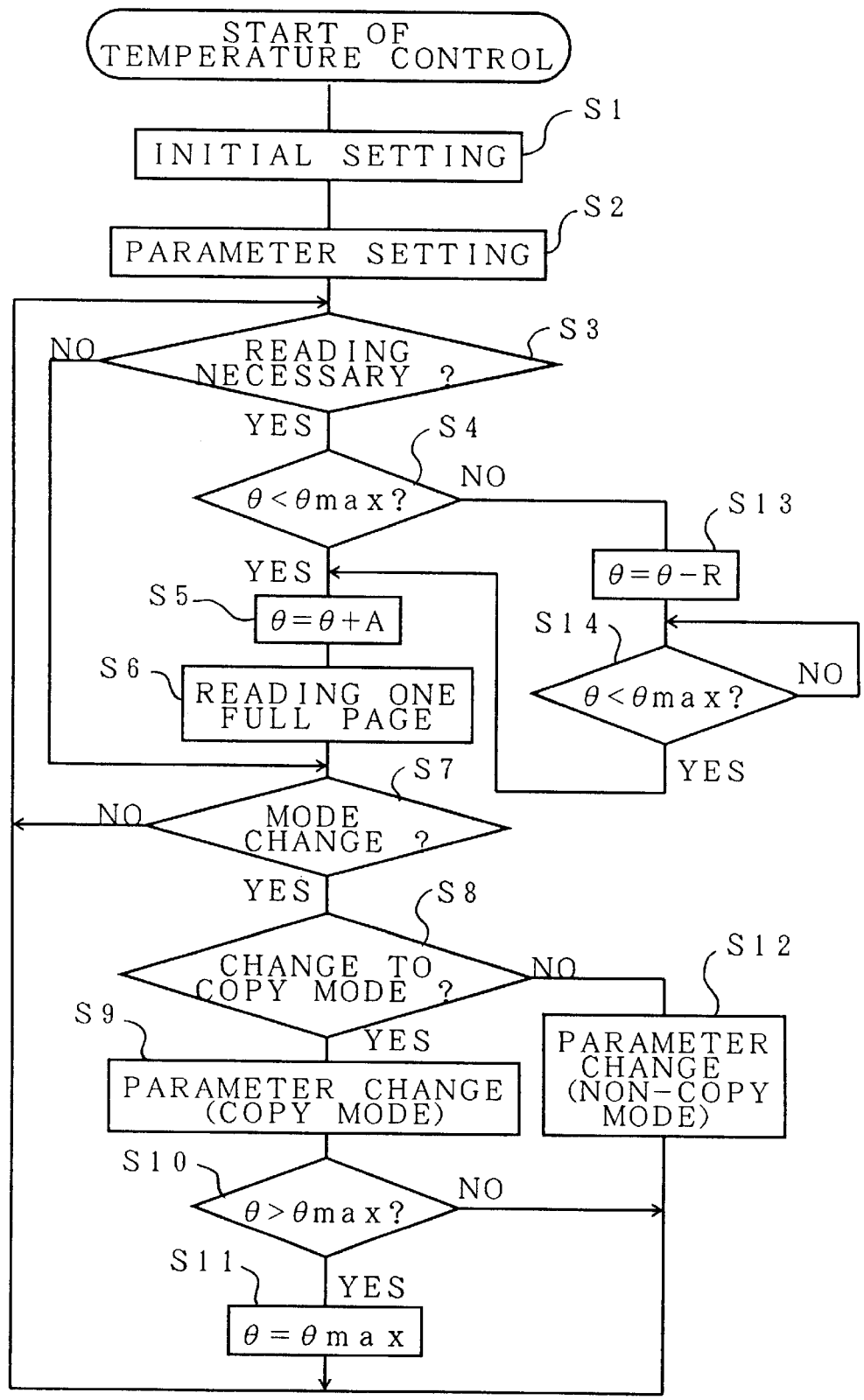
FIG. 3 is a flow diagram showing the successive steps of temperature control according to a first embodiment.

Next, reference is made to the flow diagram of FIG. 3 to describe the specific manner of controlling the temperature of the paper feed motor 15.

When the facsimile machine is turned on, the initial setting means 1a of the CPU 1 initializes the value of the temperature representative variable $\theta$ for use at the temperature rise estimating means 1c (Step S1). In the illustrated embodiment, the initial value of the variable $\theta$ is an integer of no less than zero (0) but may be set to reflect the room temperature.

Then, the parameter setting means 1b of the CPU 1 sets the incremental parameter A, the decremental parameter S, the upper limit parameter $\theta$max, and the compensation parameter R for temperature estimation and control at the temperature rise estimating means 1c and the temperature drop estimating means 1d, respectively. Such parameter setting is performed in different ways depending on the present operation mode of the facsimile machine.

For instance, the parameter setting means 1b sets a lower value for the upper limit parameter $\theta$max in the copy mode of the facsimile machine than in any other operation mode. In the copy mode, the ambient temperature around the paper feed motor 15 rises due to thermal image fixing at the recording unit 12, so that it is necessary to lower the upper limit parameter θmax for preventing an overheat of the motor 15.

On the other hand, the parameter setting means 1 sets a greater value for each of the incremental parameter A and the compensation parameter R in the super-fine fax transmission mode than in any other fax transmission mode (e.g. fine transmission mode or standard transmission mode). This is because the paper feed motor 15 is driven at a low speed in the super-fine transmission mode to cause a large heat generation for feeding one paper. However, the decremental parameter S may be set to have the same value for any operation mode of the facsimile machine.

In Step S3, the CPU 1 determines whether reading is necessary or not. Specifically, the CPU 1 determines whether or not the paper feed motor 15 under power supply has already transferred an image carrying paper to a reading start position in the reading unit 11. The detection of the paper may be performed by an unillustrated sensor for example.

If reading is necessary ("Yes" in Step S3), the power supply prevention means 1e of the CPU 1 determines whether the present value of the variable θ is lower than the upper limit parameter θmax (Step S4).

If "Yes" in Step S3, power supply to the paper feed motor 15 continues, assuming that the temperature of the motor has not reached the upper tolerable limit. Therefore, the temperature rise estimating means 1c adds the incremental parameter A to the variable θ, and the resulting sum is used as a new value for the variable θ (Step S5). As a result, the value of the variable θ increases to reflect a temperature increase of the motor 15 as long as the power supply to the motor continues.

By driving of the paper feed motor 15, the full page of the image carry paper is read at the reading unit 11 for image output (Step S6).

In Step S7, the parameter setting means 1b of the CPU 1 determines whether the user manipulates the operation unit 13 to demand a change of the operation mode of the facsimile machine.

If a mode change is demanded ("Yes" in Step S7), the parameter setting means 1b then determines whether the requested change is a shift to the copy mode (Step S8).

If "Yes" in Step S8, the values of the parameters A, θmax, S and R are renewed by the parameter setting means 1b to suit the copy mode for setting at the temperature rise estimating means 1a and the temperature fall estimating means 1b (Step S9).

In Step S10, the wait-time reduction means 1f determines whether the present value of the variable θ is lower than the upper limit parameter θmax. As previously described, the value of the upper limit parameter θmax for the copy mode is lower than that for any other operation mode, so that such checking is necessary because the present value of θ, which was lower that the previous value of θmax, may be higher than the renewed value of θmax.

If the present value of the variable θ is higher than the presently set value of the upper limit parameter θmax ("Yes" in Step S10), the wait-time reduction means 1f replaces the present value of θ with the renewed value of θmax (Step S11) for use at the power supply prevention means 1e, and the temperature control process returns to Step S3. In this way, it becomes unnecessary for the user, before starting the copying operation, to wait for a long time until the value of θ gets below the renewed value of θmax.

If "No" in Step S10 (namely, if the present value of the variable θ is lower than θmax ), the temperature control process immediately returns to Step S3 because the user need not wait before starting the copy mode.

If a selected mode change is not a shift to the copy mode ("No" in Step S 8), the parameter setting means 1b of the CPU 1 sets the parameters to suit to the newly selected mode (Step S12), and the temperature control process returns to Step S3.

If "No" in Step S7 (namely, if no mode change is demanded), the temperature control process immediately returns to Step S3 because there is no need for changing the presently set parameters.

In Step S4, if the present value of the variable θ is no less than the upper limit parameter θmax ("No" in Step S4), the power supply prevention means 1e of the CPU 1 first subtracts the value of the compensation parameter R from the θ value (Step S3). The subtraction of R is performed to compensate for estimation errors, thereby making the estimated temperature (the calculated value of θ) to more closely coincide with the actual temperature of the paper feed motor 15.

After such a compensation, the power supply prevention means 1e then determines whether the subtracted value of θ is lower than θ max (Step S 14).

If "Yes" in Step S14, the temperature control process proceeds to Step S5 because the paper feed motor 15 may continue to be driven.

On the other hand, if the compensated value of the variable θ is still no less than the upper limit parameter θmax ("No" in Step S14), the power supply prevention means 1e causes the motor control means 1g to inhibit power supply to the paper feed motor 15, consequently preventing an overheat of the motor. Such inhibition of power supply to the motor 15 continues until the value of θmax lowers under θmax with time due to the periodic or repetitive interruption process illustrated in the flow diagram of FIG. 4 (to be described hereinafter).

In Step S3, if there is no paper to read in the reading unit 13 ("No" in Step S3), the temperature control process proceeds to Step S7 since it is unnecessary to drive the paper feed motor 15.

In the course of the temperature control process described above, the interruption process shown in FIG. 4 is periodically or repetitively inserted to account for a temperature drop due to heat dissipation from the paper feed motor 15. Such an interruption process is repetitively conducted at an time interval of 1/60 seconds for example.

Figure 4:
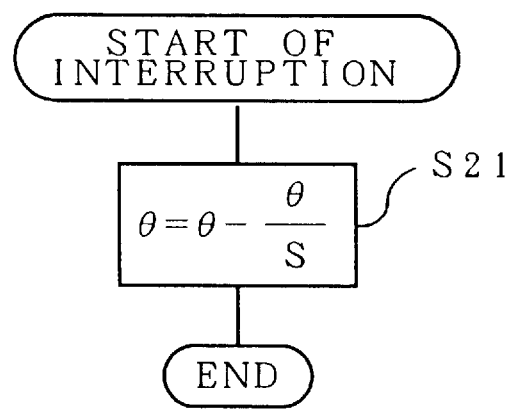
FIG. 4 is a flow diagram showing an interruption process for estimating a temperature drop in the first embodiment.

As shown in FIG. 4, the interruption process is performed by the temperature drop estimating means 1d of the CPU 1 for calculating θ−θ/S to use the resulting value as a new value for θ (Step S21). As can be readily understood, the renewed value of θ decreases quickly if the present value of θ is high, whereas the renewed value of θ decreases gently if the present value of θ is low. Thus, the temperature drop estimation provided by the temperature drop estimating means 1d closely simulates the actual temperature drop of the paper feed motor 15 which depends on the temperature difference between the motor temperature and the ambient temperature.

In the interruption process according to the illustrated embodiment, the fractions of the term "θ/S" in θ−θ/S is discarded or ignored. However, the fractions of the term "θ/S" may be raised to a unit or rounded, in which case the renewed value of θ ultimately decreases to zero (0) upon lapse of a sufficient time.

Figure 5:
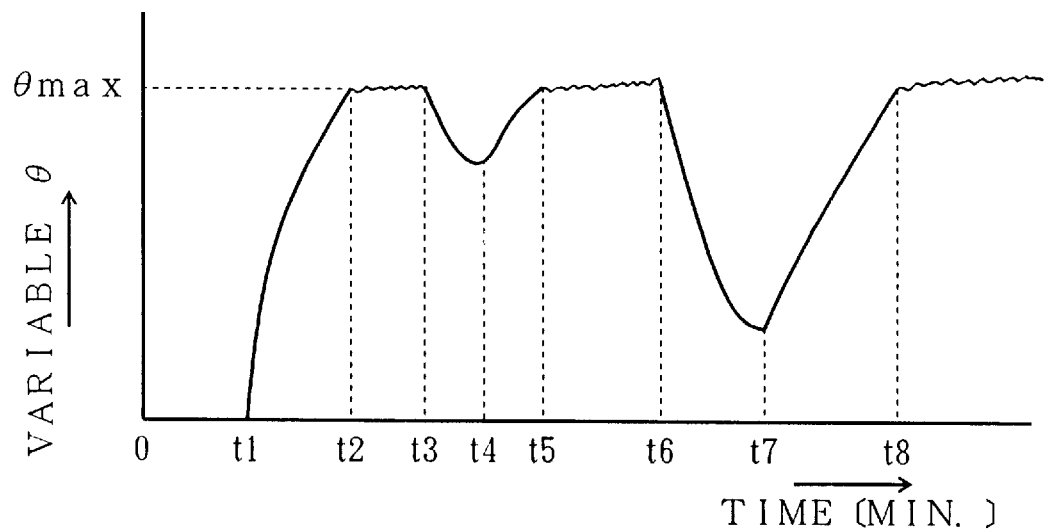
FIG. 5 is a graph showing the temperature variations of the motor when performing successive copying.

FIG. 5 shows how the value of the variable θ (namely, the estimated temperature of the paper feed motor 15) varies as a result of the above-described temperature control (including the interruption process) when successive copying is repeated. Specifically, assuming that copying of a first batch of papers is started at time t1, the value of θ reaches the presently set value of the upper limit parameter θmax at time t2 upon successive copying of 50 papers for example. After time t2, the remaining papers of the first batch are copied successively and intermittently at an time interval of e.g. 13 seconds between the respective papers, but an overheat heat of the motor 15 is prevented due to the insertion of such an interval. Copying of the last paper of the first batch finishes at time t3.

When copying of a second batch of papers is resumed at time t4 after a lapse of 5 minutes from time t3 without any copying, the value of θ again reaches θmax at time t5 upon successive copying of 10 papers for example. After time t5, the remaining papers of the second batch are copied successively and intermittently at an time interval of e.g. 13 seconds between the respective papers. Copying of the last paper of the first batch finishes at time t6.

When copying of a third batch of papers is resumed at time t7 after a lapse of 40 minutes from time t6 without any copying, the value of θ again reaches θmax at time t8 upon successive copying of 40 papers for example. After time t8, the remaining papers of the third batch are copied successively and intermittently at an time interval of e.g. 13 seconds between the respective papers.

In this way, the paper feed motor 15 can be prevented from being damaged due to an overheat. Since the motor 15 can be restarted as long as the value of the variable θ is below θmax, the motor 15 need not be unnecessarily stopped for a long time for purposes of protection.

Figure 6:
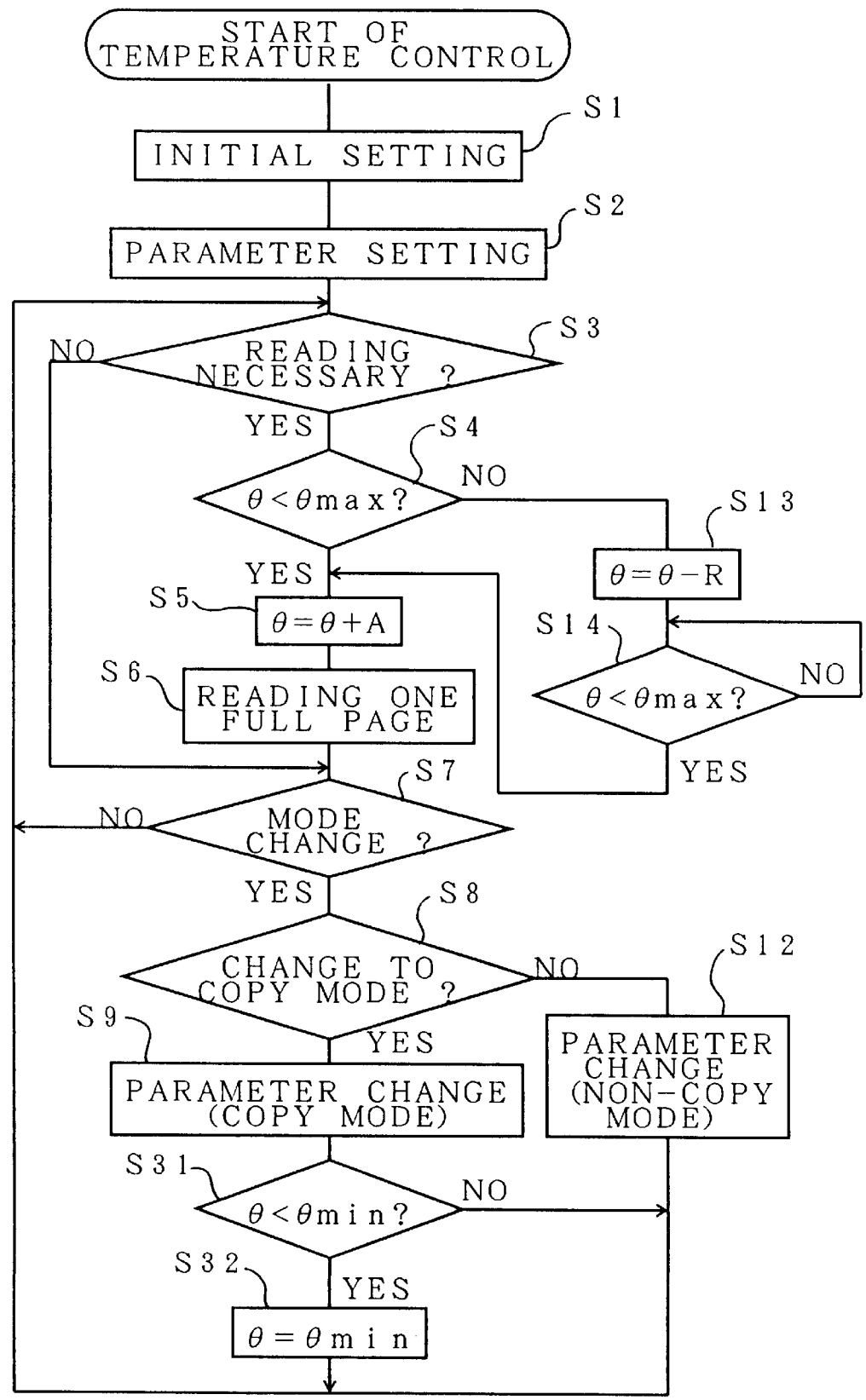
FIG. 6 is a flow diagram showing the successive steps of temperature control according to a second embodiment.

FIG. 6 shows a flow diagram showing a second embodiment of temperature control. The second embodiment is similar to the first embodiment shown in FIG. 3 but differs therefrom in that Steps S10 and S11 of the first embodiment are replaced by Steps S31 and S32, respectively. More specifically, after a mode shift to the copy mode (Step S8) and after the corresponding parameter setting (Step S9), the temperature rise estimating means 1c of the CPU 1 determines whether the present value of the variable θ max is lower than a predetermined lower limit parameter θmin set by the parameter setting means 1b (Step S31), and if "Yes", replaces the present θ value by θmin (Step S32).

As previously described, the ambient temperature near the paper feed motor 15 gets higher in the copy mode of the facsimile machine than in any other operation mode. Thus, according to the second embodiment, the lower limit parameter θmin is used to reflect a rise of the ambient temperature instead of lowering the value of the upper limit parameter θmax, thereby preventing an overheat of the motor 15. It should be noted the tolerable limit temperature of the motor 15 is constant regardless of the operation mode of the facsimile machine, so that it is preferable not to alter the value of the upper limit parameter θmax for closely controlling the temperature of the motor.

Figure 7:
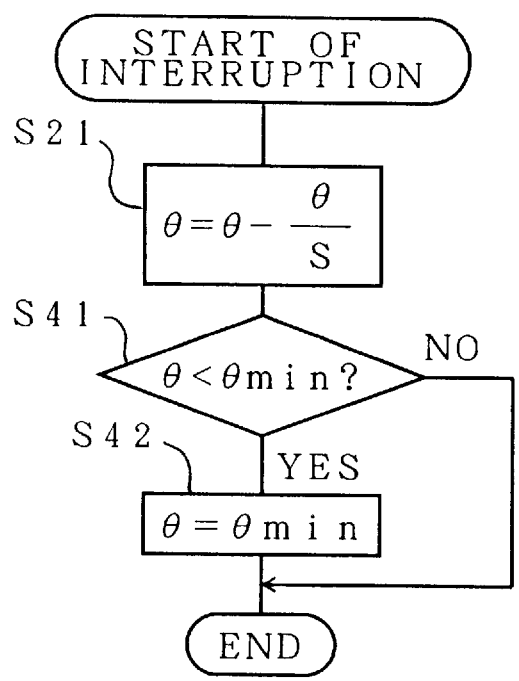
FIG. 7 is a flow diagram showing an interruption process for estimating in the second embodiment.

In addition to or as an alternative to Steps S31 and S32 illustrated in FIG. 6, the interruption process performed by the temperature drop estimating means 1d of the CPU 1 may, after Step S21, determine whether the present value of the variable θmax is lower than a predetermined lower limit parameter θmin (Step S41), and if "Yes", replaces the present θ value by θmin (Step S42), as shown in FIG. 7. Since the interruption process is performed periodically or repetitively at an short interval of e.g. 1/60 seconds, Steps S31 and S32 in FIG. 6 may be omitted.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

I claim:

1. An apparatus for controlling temperature of a motor by estimation on the basis of a temperature representative variable θ as well as different parameters which include an incremental parameter A reflecting a temperature rise under driving of the motor, a decremental parameter S reflecting a temperature drop by heat dissipation of the motor, and an upper limit parameter θmax reflecting an upper tolerable limit temperature of the motor, the apparatus comprising:

initial setting means for setting an initial value of θ;

temperature rise estimating means for calculating θ+A for renewal of θ when the motor is driven;

temperature drop estimating means for calculating θ−θ/S for renewal of θ periodically at a predetermined time interval while the temperature control apparatus is operating; and power supply prevention means for preventing power supply to the motor when θ becomes no less than θmax and until θ becomes lower than θmax.

2. The temperature control apparatus according to claim 1, wherein the power supply prevention means first subtracts a predetermined compensation parameter R from θ for compensation thereof when θ becomes no less than θmax, the power supply prevention means preventing power supply to the motor only when the thus compensated θ is still higher than θmax.

3. The temperature control apparatus according to claim 1, wherein the temperature drop estimating means calculates θ−θ/S for renewal of θ as an interruption process.

4. The temperature control apparatus according to claim 1, wherein the motor is driven under different operation modes, the temperature control apparatus further comprising parameter setting means for setting the parameters A, S and θmax selectively depending on the different operation modes.

5. The temperature control apparatus according to claim 4, wherein the motor is a paper feed motor of a copying machine, the parameter setting means being designed to set a lower value for θmax in a copy mode than in any other operation mode.

6. The temperature control apparatus according to claim 5, further comprising wait-time reduction means for determining whether θ is higher than θmax upon a shift to the copy mode from another operation mode and for replacing θ with θmax when θ is determined to be higher than θmax.

7. The temperature control apparatus according to claim 4, wherein the motor is a paper feed motor of a copying machine, the parameter setting means being designed to set a lower limit parameter θmin for reflecting an ambient temperature rise in a copy mode, the temperature rise estimating means having additional functions of determining in the copy mode whether θ is lower than θmin and replacing θ with θmin when θ is determined to be lower than θmin.

8. The temperature control apparatus according to claim 4, wherein the motor is a paper feed motor of a copying machine, the parameter setting means being designed to set a lower limit parameter θmin for reflecting an ambient temperature rise in a copy mode, the temperature drop estimating means having additional functions of determining, periodically at the predetermined time interval in the copy mode, whether θ is lower than θmin and replacing θ with θmin when θ is determined to be lower than θmin.

9. An apparatus for controlling temperature of a heat generating load by estimation on the basis of a temperature representative variable θ as well as different parameters which include an incremental parameter A reflecting a temperature rise under driving of the load, a decremental parameter S reflecting a temperature drop by heat dissipation of the load, and an upper limit parameter θmax reflecting an upper tolerable limit temperature of the load, the apparatus comprising:

initial setting means for setting an initial value of θ;

parameter setting means for setting the parameters A, S and θmax selectively depending on different operation modes of the load;

temperature rise estimating means for calculating θ+A for renewal of θ when the load is driven;

temperature drop estimating means for calculating θ−θ/S for renewal of θ periodically at a predetermined time interval while the temperature control apparatus is operating; and power supply prevention means for preventing power supply to the load when θ becomes no less than θmax and until θ becomes lower than θmax.

10. The temperature control apparatus according to claim 9, wherein the power supply prevention means first subtracts a predetermined compensation parameter R from θ for compensation thereof when θ becomes no less than θmax, the power supply prevention means preventing power supply to the load only when the thus compensated θ is still higher than θ max.

11. The temperature control apparatus according to claim 9, wherein the parameter setting means being designed to set a lower value for θmax in one operation mode of the load than in any other operation mode.

12. The temperature control apparatus according to claim 11, further comprising wait-time reduction means for determining whether θ is higher than θmax upon a shift to said one operation mode from another operation mode and for replacing θ with θmax when θ is determined to be higher than θmax.

13. The temperature control apparatus according to claim 9, wherein the parameter setting means is designed to set a lower limit parameter θmin for reflecting an ambient temperature rise in one operation mode of the load, the temperature rise estimating means having additional functions of determining in said one operation mode whether θ is lower than θmin and replacing θ by θmin when θ is determined to be lower than θmin.

14. The temperature control apparatus according to claim 9, wherein the parameter setting means is designed to set a lower limit parameter θmin for reflecting an ambient temperature rise in one operation mode of the load, the temperature drop estimating means having additional functions of determining, periodically at the predetermined time interval in said one operation mode, whether θ is lower than θmin and replacing θ by θmin when θ is determined to be lower than θmin.

15. A processor program embodied on an information storing medium for controlling temperature of a motor by estimation on the basis of a temperature representative variable θ as well as different parameters which include an incremental parameter A reflecting a temperature rise under driving of the motor, a decremental parameter S reflecting a temperature drop by heat dissipation of the motor, and an upper limit parameter θmax reflecting an upper tolerable limit temperature of the motor, the processor program comprising:

an initial setting program for setting an initial value of θ;

a temperature rise estimating program for calculating θ+A for renewal of θ when the motor is driven;

a temperature drop estimating program for calculating θ−θ/S for renewal of θ periodically at a predetermined time interval; and a power supply prevention program for preventing power supply to the motor when θ becomes no less than θmax and until θ becomes lower than θmax.

16. The processor program according to claim 15, wherein the power supply prevention program first subtracts a predetermined compensation parameter R from θ for compensation thereof when θ becomes no less than θmax, the power supply prevention program preventing power supply to the motor only when the thus compensated θ is still higher than θmax.

17. The processor program according to claim 15, further comprising a parameter setting program for setting the parameters A, S and θmax selectively depending on different operation modes of the motor.

18. The processor program according to claim 17, wherein the parameter setting program being designed to set a lower value for θmax in one operation mode of the motor than in any other operation mode.

19. The processor program according to claim 18, further comprising a wait-time reduction program for determining whether θ is higher than θmax upon a shift to said one operation mode from another operation mode and for replacing θ by θmax when θ is determined to be higher than θmax.

20. The processor program according to claim 16, wherein the parameter setting program sets a lower limit parameter θmin for reflecting an ambient temperature rise in one operation mode of the motor, the temperature rise estimating program having additional functions of determining in said one operation mode whether θ is lower than θmin and replacing θ by θmin when θ is determined to be lower than θmin.

21. The processor program according to claim 16, wherein the parameter setting program sets a lower limit parameter θmin for reflecting an ambient temperature rise in one operation mode of the motor, the temperature drop estimating program having additional functions of determining, periodically at the predetermined time interval in said one operation mode, whether θ is lower than θmin and replacing θ by θmin when θ is determined to be lower than θmin.

* * * * *